US012222087B1

(12) United States Patent
Pelletier et al.

(10) Patent No.: US 12,222,087 B1
(45) Date of Patent: Feb. 11, 2025

(54) LUMINAIRE WITH DIRECTED LIGHT FIELD AND PROJECTION MASK

(71) Applicant: Sterling Lighting LLC, Danville, VA (US)

(72) Inventors: Kevin Pelletier, Rancho Cordova, CA (US); Michael LeVasseur, Rancho Cordova, CA (US)

( * ) Notice: Subject to any disclaimer, the term of this patent is extended or adjusted under 35 U.S.C. 154(b) by 0 days.

(21) Appl. No.: 18/597,167

(22) Filed: Mar. 6, 2024

(51) Int. Cl.
*F21V 11/08* (2006.01)
*F21S 8/08* (2006.01)

(52) U.S. Cl.
CPC ............... *F21V 11/08* (2013.01); *F21S 8/086* (2013.01)

(58) Field of Classification Search
CPC ................................. F21V 11/08; F21S 8/086
See application file for complete search history.

(56) References Cited

U.S. PATENT DOCUMENTS

| | | | | |
|---|---|---|---|---|
| 9,341,321 | B2 * | 5/2016 | Hand | F21V 13/02 |
| 2009/0103288 | A1 * | 4/2009 | Boyer | F21V 7/04 362/153.1 |
| 2011/0228541 | A1 * | 9/2011 | Treanton | F21S 8/086 362/362 |
| 2012/0008320 | A1 * | 1/2012 | Tu | F21V 11/02 362/235 |
| 2014/0313718 | A1 * | 10/2014 | Marquardt | F21V 11/16 362/241 |
| 2015/0323157 | A1 * | 11/2015 | Jeong | F21V 5/04 362/237 |
| 2020/0088384 | A1 * | 3/2020 | Chiu | F21V 11/16 |

* cited by examiner

*Primary Examiner* — Tracie Y Green
*Assistant Examiner* — Michael Chiang

(57) ABSTRACT

A path light having a shaped pathway of projected light that minimizes distracting illumination of the vertical leg of the luminaire with a shaped mask over the light source. The mask forms shaped shadows that guide the light around the support leg and onto the desired pathway.

4 Claims, 1 Drawing Sheet

LUMINAIRE WITH DIRECTED LIGHT FIELD AND PROJECTION MASK

FIELD OF THE INVENTION

The invention relates to a path light having a directional light and a hidden light source.

BACKGROUND OF THE INVENTION

The primary purpose of a light fixture is to deliver light to desired objects, areas and features. Rarely is it the light fixture's purpose to illuminate itself. Brightly illuminated fixtures can be distracting and even unsafe.

In most scenarios it is highly desired for the source of the emitted light be completely hidden. When the source is not hidden well, the result can be highly detrimental to the application. Glare in the form of high intensity light from the emitting source that can be seen by a passerby can be blinding and create safety issues.

Typically, the desired distribution of light from a path light needs to be such that the light extends a distance that is much further than the height of the fixture. It is also desirable that the emitted light minimizes glare by undesirable reflection from any vertical legs of the light.

It would be desirable to have a path light with emitted light that minimizes glare from undesired impact with a vertical member of the light.

SUMMARY OF THE INVENTION

It is an object of the invention to provide a path light with reduced glare from incident light falling on a vertical member of the light.

It is further an object of the invention to provide a path light having a directed light output pattern that minimizes incident light on the fixture itself.

In accordance with these and other objects of the invention that are described more completely herein, a path light according to the invention comprises: (a) a horizontally extended member that comprises a light source within a chamber and that can project light through an downwardly directed opening in said chamber, (b) a vertically extended member that elevates said horizontally extended member, and (c) a projection mask partially obstructing said opening to obstruct light from said light source from falling on said vertically extended member.

The path light according to the present invention is effective at providing a wide path of desired illumination without allowing light to fall undesirably on the leg of the light or create an undesirable source of glare from that leg. The net result is a more aesthetically pleasing and desired path of illumination for a path light.

DETAILED DESCRIPTION OF THE INVENTION

A path light according to the invention comprises: (a) a horizontally extended member that comprises a light source within a chamber and that can project light through an downwardly directed opening in said chamber, (b) a vertically extended member that elevates said horizontally extended member, and (c) a projection mask partially obstructing said opening to obstruct light from said light source from falling on said vertically extended member.

As used herein, the term "opening" refers to a spatial opening that is unobstructed or that is formed of a clear panel that does not substantially obstruct the emission of light through said panel, but which is effective to prevent water and environmental contaminants from affecting the luminaire's light source behind the opening.

The invention is preferably described with reference to the attached drawings.

Figure 1:
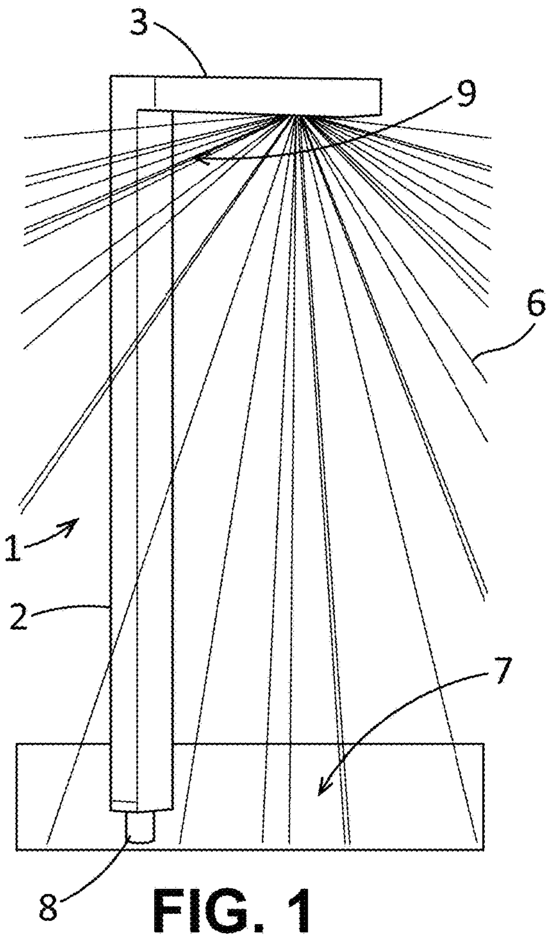
FIG. 1 is a view of a path light according to the invention.

As shown in FIG. 1, path light 1 is made with a vertically extending leg member 2 that is connected to a relatively shorter, horizontally extended arm member 3 in a generally L-shaped light. Light source 4 is located in chamber 5 in the horizontally extended member and is disposed to project light 6 downwardly onto the path 7 below.

Spike 8 is preferably used at the bottom of the vertically extended member to secure path light 1 in the ground along path 7.

Figure 2:
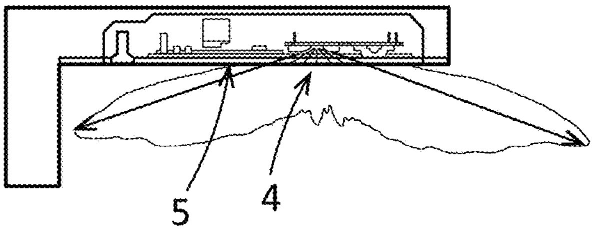
FIG. 2 is a cross sectional view of the light chamber in a path light according to the invention.

Light 6 is projected outwardly around light source 4 in a substantially even pattern to the front, rear, and sides. (See FIG. 2.) Unfortunately, some portion of the projected light is directed in a backwards direction towards leg member 2 thereby illuminating leg member 2. Leg member 2 can be round, triangular, square, rectangular, pentagonal, hexagonal or virtually any geometric cross sectional shape. Depending on the shape of leg member 2, at least some portion of backwards light 9 will be reflected forward and potentially into view of a passerby. Such uncontrolled reflections can be a distraction at best or a dangerous glare at worst. Neither is desirable.

Figure 3:
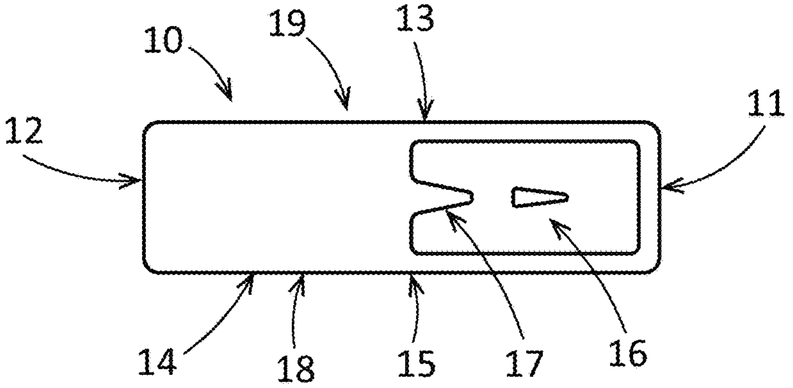
FIG. 3 is a light mask that is useful according to the invention for directing light emanating from the light chamber of the path light.

FIG. 3 shows a preferred projection mask 10 for use with the rectangular arm member 3 of FIG. 1. Mask 10 is positioned on the bottom of arm member 3 across chamber 5 to block and shape light coming from light source 4 through chamber 5. As shown, mask 10 is generally rectangular in shape with a front portion 11, a rear portion 12, and lateral portions 13, 14. It will be understood that the external shape of mask 10 can be any shape that fits over chamber 5. Preferably, mask 10 is made of a flexible, substantially clear plastic or shaped glass that can be installed on or in arm member 3 across light source 4 and chamber 5 by suitable mechanical or adhesive systems. Preferably, mask 10 seals chamber 5 against the ingress of water and other environmental contaminants.

The important portion of mask 10 is the presence of substantially opaque printed portions that substantially block light coming from chamber 5 into a desired shape that minimizes lighting paths that illuminate leg member 2.

For the L-shaped luminaire of FIG. 1 made from square tubes, rear portion 12 is substantially opaque to a middle position 15 and clear in most of forward thereof. This blocks a sufficient amount of the overall light from falling on leg member 2.

Additionally, mask 10 includes a first triangular opaque shape 16 that is positioned on mask 10 to be disposed substantially under light source 4 when installed on arm member 3 and across chamber 5. A triangular shape will shape light from source 4 with a shadow that is narrower at the front than at the rear. The relatively wider rear shadow shapes the light to fall on either side of leg member 2.

Mask 10 also includes a second triangular shape 17 at midpoint 15 and extending from opaque rear portion 18.

Second triangular shape 17 further shapes a shadow from chamber 5 that is wider at the rear than at the front so that light falls downwardly on either side of leg member 2. The combined effects of mask shapes 16, 17 combine to shape the projected light to avoid illuminating leg member 2.

As described herein, mask 10 has opaque shapes that block light coming from chamber 5. It may be desirable to form the opaque areas 16, 17, 18 with a reflective material or paint that blocks light from shining down but which reflects the blocked light on opposite side 19 back up into chamber 5 for internal reflection and return through the clear areas of mask 5 for illumination of the desired pathway.

What is claimed is:

1. A path light that comprises: (a) a horizontally extended member that comprises a light source within a chamber and that can project light through a downwardly directed opening in said chamber, (b) a vertically extended member that elevates said horizontally extended member, and (c) a generally rectangular projection mask partially obstructing said opening to obstruct light from said light source from falling on said vertically extended member, wherein said projection mask exhibits an opening that can be positioned under said light source of said chamber to partially obstruct light from said light source, said projection mask exhibiting a first shape that is positioned under said light source to form a shadow in projected light that is wider across said chamber in a rear portion thereof than a front portion thereof.

2. A path light according to claim 1 wherein said horizontally extended member is shorter than said vertically expended member.

3. A path light according to claim 2 wherein said horizontally extended member and said vertically extended member form an L-shape that projects light downwardly.

4. A path light according to claim 1 wherein said mask further comprises a second shape that is not directly under said light source and which forms a shadow in projected light from said chamber that is wider across said chamber in a rear portion thereof than a front portion thereof.

* * * * *